Patented June 11, 1946

2,401,819

UNITED STATES PATENT OFFICE 2,401,819

CULTURE OF YEAST

Eric W. Eweson, New York, N. Y.

No Drawing. Application September 2, 1942,
Serial No. 457,029

6 Claims. (Cl. 195—57)

This invention relates to the culture of yeast, especially to a method of producing and using dry fermentable yeast, and to the product of the process, and has for an object the provision of improvements in this art.

One of the objects of the invention is to produce a yeast with greatly improved resistance to de-hydration, storage and re-hydration. This object is attained by coating the membranes of the yeast cells before drying with lignin, whereby they are protected during drying, storage and subsequent re-hydration and, as a result, have the maximum surviving fermentation power when the yeast is finally used.

Another object is to utilize sulphite liquor, the waste product from sulphite pulp mills, to produce a superior quality of dry yeast through the processing of yeast produced under the adverse and thus toughening conditions inherent in the production of yeast from sulphite liquor.

Common baker's yeast (about 70% moisture) has been successfully produced from sulphite liquor by the so-called Heijkenskjold process, exemplified in Patent No. 1,680,043, August 7, 1928.

The Heijkenskjold process is based on the fact that sulphite liquor contains certain amounts of sugars. In broad outline, the Heijkenskjold process comprises the following steps: (1) neutralization of the acid liquor with a suitable basic material such as ammonia and powdered limestone; (2) filtration of the neutralized sulphite liquor; (3) initiating the growth of "supernourished" seed yeast in a favorable environment as, for example, in a sugar solution or molasses; (4) continued propagation of yeast in the sugar solution while adding sulphite liquor and other nutritive material, and actively aerating the wort to protect the yeast from the toxic effect of the non-sugar components in the sulphite liquor and to prevent the formation of alcohol; (5) separation of the yeast from the wort; (6) washing the separated yeast repeatedly so that the sulphite liquor solids will be removed from the yeast; (7) filter-compressing the washed yeast to the usual marketable condition of common baker's yeast (about 70% moisture content).

The composition of sulphite liquor varies considerably depending on the type of wood used and the methods of sulphite cooking. The total quantity of solids in the liquor varies from 100 to 140 grams per liter, of which from 20 to 30 grams (about 20%) are sugars. More than 50% of the solids consists invariably of lignin, a dark brown, water-soluble organic substance, which broadly may be described as calcium ligno-sulphonate.

In "spent" sulphite liquor the proportion of lignin is slightly higher, due to the yeast having consumed the fermentable sugars (about 60% of the total sugars) but being unable to assimilate the lignin.

Heijkenskjold states that for the production of a good grade of common baker's yeast it is of great importance that the yeast be washed and separated repeatedly so that all or substantially all of the sulphite liquor will be removed from the yeast. On the contrary, according to the present invention, the sulphite liquor must not be washed away from the yeast. I have found that under such conditions the lignin forms a protective coating on the membranes of the yeast cells, and that such yeast can thereafter with great advantage be dried by known methods to produce a very potent, fermentable, dry yeast which has an unusually long life and a high survival rate remaining after the yeast is re-hydrated and ready for yeast.

Sulphite liquor is a very cheap material, hence it provides an economical substance for propagating yeast in spite of the fact that it has a comparatively low sugar content according to present day standards of yeast production. The yeast from sulphite liquor is preferred for the present process and product, both on account of economy of operations and on account of the hardy type of yeast which it provides as a result of propagating the fungi in a toxic environment.

It is possible, however, to secure some of the advantages of the present invention by using a yeast which is derived from other sugar sources, notably molasses or grain. This may be accomplished by the pre-treatment of such yeast under aeration in a neutralized and filtered sulphite yeast liquor wort, as used in the Heijkenskjold process, or with a wort containing lignin and sugar comparable to the wort of sulphite liquor, to toughen the membranes of the yeast cells and to provide a coating of lignin. Such a wort can most simply be prepared from dehydrated sulphite liquor, already available on the market at low cost in the form of a thick syrup, having a water content of about 50%, or in the form of a powder, having a moisture content of about 2%. The total sugar content of these materials is about 20% (calculated on dry basis) of which about 60% is assimilable by the common variety of baker's yeast (Saccharomyces cerevisiae). From 5 to 10 pounds (on dry basis) of de-hydrated sulphite liquor are used for 100 pounds of water for such pre-treatment wort. The yeast concentration in the wort is preferably to be kept around 10 pounds of yeast (on dry basis) per 100 pounds of water.

Yeast when pre-treated in this manner will have a considerably higher survival rate upon de-hydration, storing and re-hydration than without such treatment, although not quite as high as yeast which has been originally propagated in sulphite liquor wort by the Heijkenskjold process.

This pre-treatment in sulphite liquor or the like will take the place of the common processes for treatment of yeast under aeration in weak sugar solutions which tend primarily to increase the glycogen content and reduce the nitrogen content of the yeast in order to make it more suitable for drying. Hence, the same pre-treatment should also be used for yeast produced by the Heijkenskjold process in case it is desirable, as aforesaid, to alter the relation of glycogen and nitrogen in the yeast, as otherwise the protective coating of lignin will be lost.

By whichever method the yeast is supplied for drying, it will have a good coating of lignin. In drying the yeast, unusual care is taken to keep the heat quite low, not over 100° F., and with abundance of air circulation to avoid the possibility of sterilizing or otherwise injuring the yeast.

The dried yeast will have a moisture content of 7% to 12%, as compared to a moisture content of about 70% for fresh, compressed baker's yeast. The relative amount of lignin combined with the yeast cells is preferably about 2% to 4% figured on dry basis.

When the dried yeast is re-hydrated for use, the lignin may be removed, if desired. For re-hydration, the dried lignin-coated yeast, as is usual with ordinary dried yeast, is mixed with water to form a milk-like emulsion. The lignin dissolves in the water. If this water is decanted after settling, the yeast is left comparatively free from lignin. If it is desirable to free the yeast from lignin more completely before it is used, it may be washed several times. Or a yeast separator may be used to avoid the loss of time required for settling and decanting.

The dried yeast produced according to the present process has a very high fermenting power after re-hydration, indicating a high final survival rate of virile yeast cells.

As an indication of the fermentation power of dried yeast, it has been common to count the percentage of live cells, the theory being that the higher the percentage of live cells, the higher the fermentation power of the dried yeast. This, I have found, does not hold true, as conclusively proven by numerous baking tests of dried yeast. For instance, dried yeasts containing as high a live cell count as 98% have shown less fermentation strength than dried yeasts with a live cell count of only 75% to 80%. These experiments indicate that there are factors other than the percentage of live yeast cells in the dried yeast which determine its fermentation power after re-hydration, and one of these factors is obviously that in the same manner as some yeast cells are destroyed during the de-hydration process, other yeast cells are destroyed by the more sudden strain to which they are exposed during the re-hydration process which has to be undergone before the yeast can be utilized for baking or other purposes. Whereas it is practical to dry yeast in such manner that the minimum of yeast cells is destroyed, notably through slow drying at low temperature, this does not prevent a relatively high percentage of yeast cells from being destroyed by the comparatively unavoidable shock of re-hydration. A lignin-coated yeast, grown or conditioned in such manner as to toughen its cell membrane, will assure the minimum number of destroyed cells, not only during the drying process but also during the re-hydration process and the intermediate storage time. The highest possible fermentation power of the resulting dried yeast relative to fresh yeast (so-called compressed yeast containing about 70% moisture content) will thus be realized by the practice of the present invention.

While one embodiment of the invention has been described in detail to furnish an understanding of the principles of the invention, the invention itself may have various embodiments within the limits of the prior art and the scope of the subjoined claims.

I claim as my invention:

1. The method of preparing a yeast having a high survival rate after re-hydration which comprises, propagating yeast cells from sulphite liquor with sufficient aeration to inhibit the formation of alcohol, the adverse conditions of propagation serving to toughen the walls of the yeast cells and coat them with lignin, separating off the yeast directly from the concentrated spent liquor in which the yeast is propagated and retaining a heavy coating of lignin from solution in the liquor on the yeast cells, drying the yeast at a low temperature while still coated with lignin, and later re-hydrating the yeast and removing the lignin at the time of use.

2. The method of preparing a yeast having a high survival rate after re-hydration which comprises, coating the yeast cells with lignin, pre-treating the yeast cells with a sugar solution containing lignin and preserving the lignin coating after the pre-treatment, drying the yeast at a low temperature while still coated with lignin, and later re-hydrating the yeast and removing the lignin coating at the time of use.

3. The method of preparing a dried yeast having a high survival rate after re-hydration which comprises, coating the yeast cells with lignin in a concentrated sulphite liquor solution containing sugar and lignin, and drying the lignin-coated cells at a low temperature.

4. The method of preparing a dried yeast having a high survival rate after re-hydration which comprises, coating the yeast cells with lignin and drying the lignin-coated cells at a low temperature.

5. As an article of manufacture, dried yeast containing live yeast cells and 7% to 12% water and a substantially complete tenaciously adherent coating of water soluble lignin on the yeast cells, the lignin coating amounting to from 2% to 4% of the weight of the yeast figured on a dry basis.

6. As an article of manufacture, dried yeast containing live yeast cells and 7% to 12% water, the yeast cells having a tough wall characteristic of propagation under adverse conditions in sulphite liquor free from alcohol, and the yeast cells having a substantially complete tenaciously adherent coating of water-soluble lignin, the lignin coating amounting to from 2% to 4% of the weight of the yeast figured on a dry basis.

ERIC W. EWESON.